United States Patent [19]

Eickemeyer et al.

[11] Patent Number: 5,442,767
[45] Date of Patent: Aug. 15, 1995

[54] ADDRESS PREDICTION TO AVOID ADDRESS GENERATION INTERLOCKS IN COMPUTER SYSTEMS

[75] Inventors: Richard J. Eickemeyer, Rochester, Minn.; Stamatis Vassiliadis, Vestal, N.Y.

[73] Assignee: International Business Machines Corporation, Armonk, N.Y.

[21] Appl. No.: 965,466

[22] Filed: Oct. 23, 1992

[51] Int. Cl.⁶ ............................................. G06F 12/00
[52] U.S. Cl. .................................. 395/401; 395/410; 395/414; 395/421.04
[58] Field of Search ........................ 395/425, 400, 375; 364/DIG. 1

[56] References Cited

U.S. PATENT DOCUMENTS

| | | | |
|---|---|---|---|
| 4,583,162 | 4/1986 | Prill | 395/400 |
| 4,594,659 | 6/1986 | Guenthner et al. | 395/375 |
| 4,729,092 | 3/1988 | Lupton | 395/425 |
| 4,760,520 | 7/1988 | Shintani et al. | 395/375 |
| 4,853,840 | 8/1989 | Shibuya | 395/375 |
| 4,888,689 | 12/1989 | Taylor et al. | 395/425 |
| 4,984,772 | 1/1990 | Langendorf | 395/375 |
| 4,991,080 | 2/1991 | Emma et al. | 395/375 |
| 5,007,011 | 4/1991 | Murayama | 395/425 |
| 5,121,473 | 6/1992 | Hodges | 395/375 |

OTHER PUBLICATIONS

INSPEC-IEEE International Conference on Computer Design: VLSI in Computers and Processors, IEEE Comput. Soc. Press, pp. 408-412, 1990, by Hua et al.
IBM TDB vol. 24, No. 1A, Jun. 1981, "Address Generate Interlock Avoidance For Branch Instructions In A Branch-History-Table Processor", by Driscoll, et al.
IBM TDB vol. 25 No. 1, Jun. 1982, "Generalized History Table For Branch Prediction", by Losq.
IBM TDB vol. 26, No. 4, Sep., 1983, "Elimination Of Address Generation Interlocks On Sequences Of Load Instructions", by Meltzer.

Primary Examiner—David L. Robertson
Assistant Examiner—Sheela N. Nadig
Attorney, Agent, or Firm—Arthur J. Samodovitz

[57] ABSTRACT

A computer system predicts an address required to execute a current iteration of a program instruction based on addresses required to execute previous iterations of the same program instruction. The system stores an address required to execute the previous iteration of the program instruction, and determines differences between addresses required to execute successive iterations of the program instruction prior to the current iteration. The system also determines and stores a current value of a delta, and predicts the address required to execute the current iteration of the program instruction based on the address required to execute the previous iteration of the program instruction plus the current value of the delta. The system sets the delta at one time equal to a difference between two addresses required to execute two successive iterations of the program instruction and updates delta when two actual differences between three addresses required to execute three successive iterations of the program instruction are equal to each other and different than delta. Thus, the system predicts constantly spaced addresses unless two successive addresses have a different spacing than the previous address. This is particularly advantageous when the program instruction adds data stored as elements of rows of one or more matrices. While the prediction will be incorrect for the first element in each row (and the first two elements in the first row) of each matrix, the prediction will be correct for all other elements in the rows, even if the inter-element spacings in rows of the different matrices are different than each other. For each of some predictions for successive iterations of the program instruction, the system negates the current value of the delta, whereby the predictions alternate between two addresses for multiple iterations of the program instruction.

8 Claims, 7 Drawing Sheets

| HIT/MISS | A | B | C | STATUS' | STATUS |
|---|---|---|---|---|---|
| 0 | X | X | X | X | 0 |
| 1 | 0 | 0 | 1 | 0 | 1 |
| 1 | 0 | 0 | 1 | 1 | 0 |
| 1 | 0 | 0 | 0 | 0 | 0 |
| 1 | 0 | 0 | 0 | 1 | 1 |
| 1 | 1 | 0 | X | 0 | 0 |
| 1 | 1 | 0 | X | 1 | 1 |
| 1 | 0 | 1 | X | 0 | 0 |
| 1 | 0 | 1 | X | 1 | 1 |
| 1 | 1 | 1 | X | 0 | 0 |
| 1 | 1 | 1 | X | 1 | 1 |

FIG.7(B)

| HIT/MISS | A | B | C | STATUS' | STATUS |
|---|---|---|---|---|---|
| 0 | X | X | X | X | 0 |
| 1 | 0 | 0 | 1 | 0 | 1 |
| 1 | 0 | 0 | 1 | 1 | 0 |
| 1 | 0 | 0 | 0 | 0 | 0 |
| 1 | 0 | 0 | 0 | 1 | 1 |
| 1 | 1 | 0 | X | X | 0 |
| 1 | 0 | 1 | X | X | 1 |
| 1 | 1 | 1 | X | 0 | 0 |
| 1 | 1 | 1 | X | 1 | 1 |

ADDRESS PREDICTION TO AVOID ADDRESS GENERATION INTERLOCKS IN COMPUTER SYSTEMS

BACKGROUND OF THE INVENTION

The invention relates generally to computer processors, and deals more particularly with a technique for predicting an address required to execute a program instruction based on one or more previous addresses used to execute previous instances of the same program instruction.

An address is required to execute some program instructions. For example, a write operation requires an address to which to write data, and a read operation requires an address from which to fetch data. A mathematical operation such as addition, subtraction, multiplication or division may require both an address from which to fetch data operands and an address to which to write the result of the mathematical operation. In some cases, the address is generated by a previous program instruction, and execution of the write, read or mathematical operation awaits generation of the address. This type of dependency is called "address generation interlock" (AGI).

The following is an example of AGI. In step one, a program instructs that an initial memory address be loaded into a first register. Then, in step two, the program instructs that the contents of the memory address stored in the first register be added to the contents of a second register. Then, in step three, the program instructs that the address stored in the first register be changed based on some formula or other criteria. Then, the program increments a variable, and compares the incremented value of the variable to a fixed number. If the variable is less than the fixed number, the program instructs a jump back to step two. Thus, a program loop is created which repeats steps two and three for the fixed number of times. After the fixed number of iterations has been completed, the second register stores a value which is the sum of the contents of the fixed number of addresses. In this type of program, each execution of step two after the first iteration requires the address generated in the previous iteration of step three. In one type of prior art computer system, each iteration of step two awaits execution of the previous iteration of step three and the program instructions are executed sequentially. The drawback of such a mode of operation is that each step in the loop adds to total execution time.

In other prior art computer systems, it was known to attempt to predict the address required by such an addition (or other type of AGI) step as being the address required by the previous iteration of the same step plus an offset or delta; the delta equals the difference between the two addresses required by the two previous iterations of the same program instruction. Then, the addition (or other type of AGI) step can begin before the address generation step is completed. This prediction technique works well when the addition (or other type of AGI step) always increments or decrements the previous address by a fixed delta. However, in many situations, the delta is not always fixed.

U.S. Pat. No. 5,093,777 discloses a more sophisticated technique for predicting addresses based on address patterns in a sequence of correct addresses.

AGIs can also occur in computing a target or subroutine address for a branch or jump instruction when the target address is generated by a previous instruction. A very successful prior art technique for predicting the target address is known as a Branch Target Buffer (BTB) technique. According to this technique, the address required for the present branch instruction is predicted to be the address used for the previous iteration of the same branch instruction. With the exception of subroutine returns and computed branches, which are a small fraction of all branches, the target is correct over 95% of the time.

In either of the foregoing prior art techniques, the actual address is calculated in parallel with the calculation of the predicted address and execution of the next instruction using the predicted address. When the actual address is finally calculated, it is compared to the predicted address. If the predicted address is correct, then processing continues where it left off using the predicted address. However, if the predicted address is incorrect, then any updates made using the predicted address are erased or overwritten, and this next instruction is executed again using the actual address. If the predictions are usually correct, system performance is improved.

A general object of the present invention is to provide an address prediction technique which is usually accurate.

Another general object of the present invention is to provide an effective address prediction technique which does not burden the system.

SUMMARY OF THE INVENTION

The invention resides in a system and method for predicting an address required to execute a current iteration of a program instruction based on addresses required to execute previous iterations of the same program instruction. The system stores an address required to execute the previous iteration of the program instruction, and determines differences between addresses required to execute successive iterations of the program instruction prior to the current iteration. The system also determines and stores a current value of a delta, and predicts the address required to execute the current iteration of the program instruction based on the address required to execute the previous iteration of the program instruction plus the current value of the delta. The system sets the delta at one time equal to a difference between two addresses required to execute two successive iterations of the program instruction and updates delta when two actual differences between three addresses required to execute three successive iterations of the program instruction are equal to each other and different than delta. Thus, the system predicts constantly spaced addresses unless two successive addresses have a different spacing than the previous address. This is particularly advantageous when the program instruction adds data stored as elements of rows of a matrix. While the prediction will be incorrect for the first element in each row (and the first two elements in the first row), the prediction will be correct for all other elements in the rows. If the program instruction then seeks to add data stored in rows of another matrix with a different inter-element spacing within each row, the prediction will be incorrect for the first element in each row (and the first two elements in the first row) in this other matrix, but will be correct for all other elements in the rows of this other matrix.

According to one feature of the invention, for each of some predictions for successive iterations of the program instruction, the system negates the current value of the delta, whereby the predictions alternate between two addresses for multiple iterations of the program instruction.

DETAILED DESCRIPTION OF THE PREFERRED EMBODIMENTS

Figure 1:
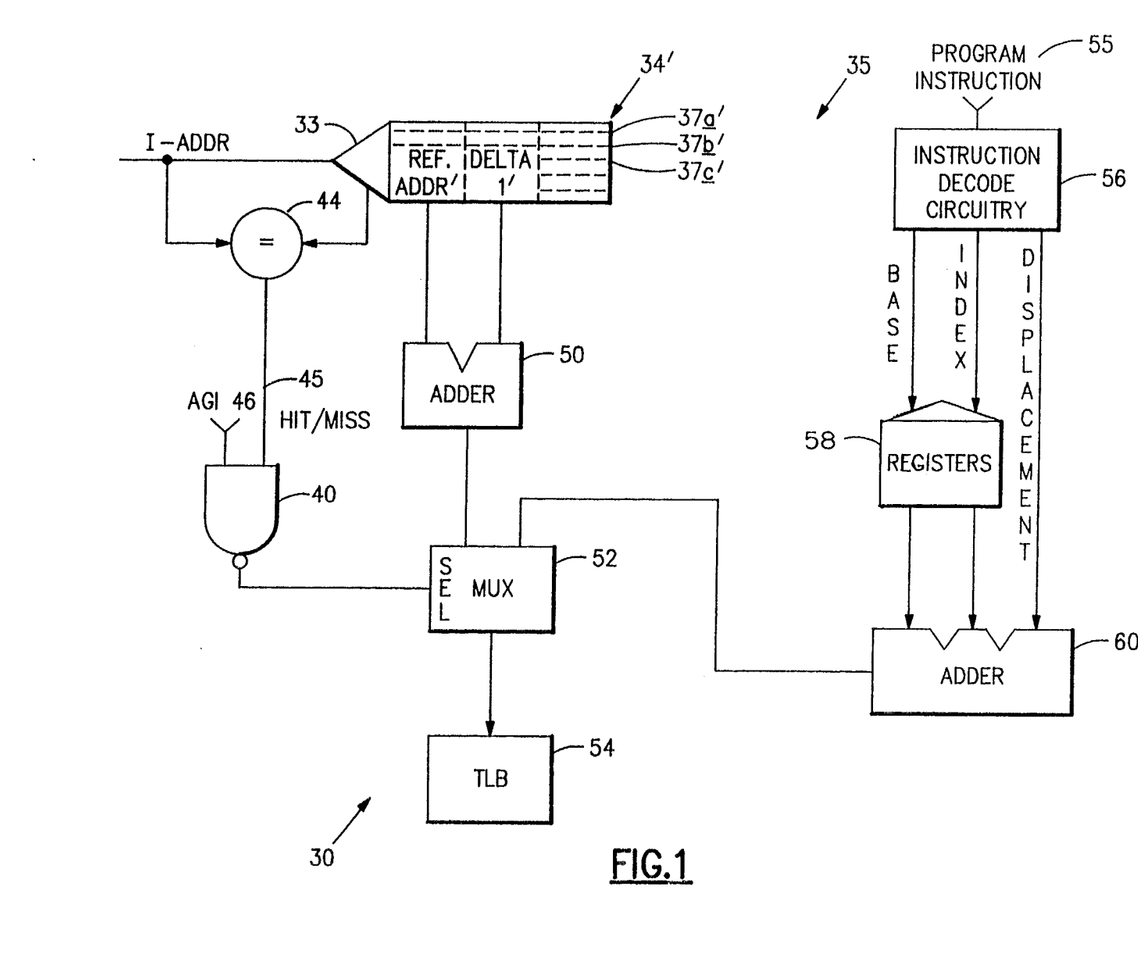
FIG. 1 is a block diagram of prediction circuitry common to all embodiments of the present invention. The prediction circuitry utilizes a table to base the predictions.
Figure 2:
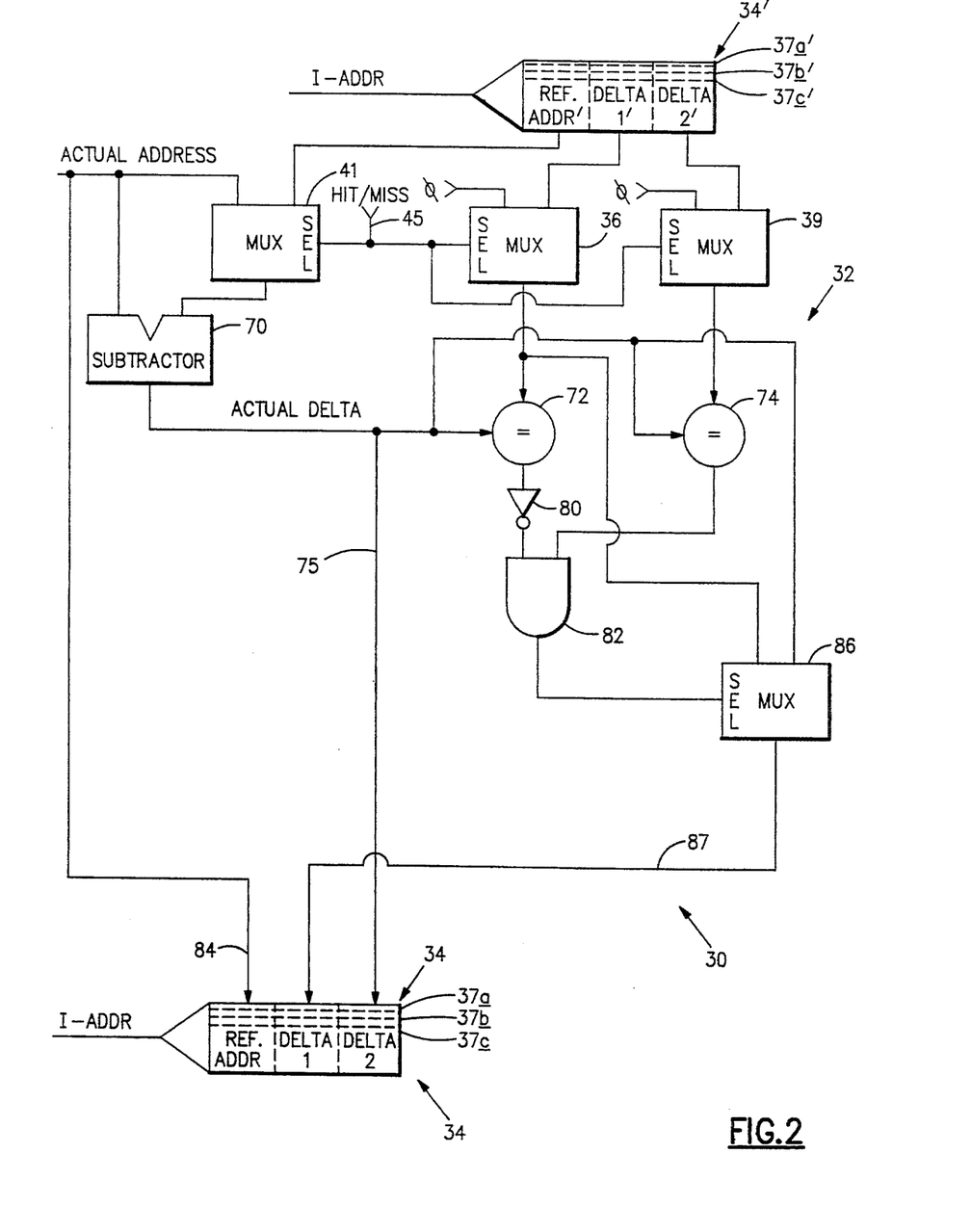
FIG. 2 is a block diagram of table management circuitry of one embodiment of the present invention.

Referring now to the figures in detail wherein like reference numerals indicate like elements throughout the different figures, FIGS. 1 and 2 illustrate a prediction system generally designated 30 according to one embodiment of the present invention. The prediction system 30 comprises table management circuitry 32 which is shown in FIG. 2 and an address prediction circuitry 35 which is shown in FIG. 1. The table management circuitry 32 maintains and updates a table 34 which stores historical data for each of a plurality of different program instructions. The prediction circuitry 35 uses the historical data from table 34 to make an address prediction for the current iteration of the program instruction when AGI exists. The table management circuitry 32 updates table 34 after each iteration of the program instruction for use in predicting the address for the next iteration of the same program iteration. In the Figures, the reference number 34' indicates the table data before update at the beginning of each iteration of the program instruction for use in the current prediction, and the reference number 34 indicates data in the same table after update at the conclusion of the iteration for use in the next prediction. By way of example, addresses stored in the table and the predicted addresses are all virtual addresses.

The following describes operation of the prediction circuitry 35. This prediction circuitry is common to all the embodiments of the invention described below; it is the table management circuitry which varies from embodiment to embodiment. First, control circuitry determines if an address generation interlock condition exists by examining the state of previous instructions. If so, the control circuitry addresses table 34' based on some bits of the virtual address ("I-addr") in which the program instruction is stored. The full virtual address, if any, from the location indicated by these bits of the virtual address is read out of the table 34' and into a comparator 44. The full virtual address of the program instruction is also supplied to the comparator 44. Thus, the comparator will output a logic one if there is an entry (a "hit") in table 34' for this program instruction, or a logic zero if there is no such entry (a "miss"). The output from the comparator is supplied to one input of a NAND gate 40, the other input is supplied by an AGI signal 46. Thus, NAND gate 40 will output a logic zero if the AGI condition exists and there is an entry 37 in table 34 from which to make an address prediction. Otherwise, NAND gate 40 will output a logic one. As described below, the logic zero output is used to select an address prediction, and the logic one is used to select the actual address after being generated by another program instruction.

Each of the entries 37a,b,c, etc. in table 34 (for all embodiments of the present invention) includes a "reference" address which was the correct address used in the previous iteration of the same program instruction, and a "delta one" value which is the predicted difference between the previous address and the predicted address for the current iteration of the program instruction.

Thus, the predicted address for the current iteration of the program instruction (for all embodiments of the present invention) is the previous address plus delta one which is provided at an output of adder 50. This predicted address is selected by multiplexor 52 when the output of NAND gate 40 is logic zero, and then supplied to a translation look aside buffer 54. Although not part of the present invention, the translation look aside buffer provides the corresponding real address in order to access the data from cache, if resident there, or otherwise from main memory.

However, when either there is no AGI or when there is AGI but no entry for the program instruction, then NAND gate 40 outputs a logic one and selects the other input to multiplexor 52. If no AGI exists, this other input was generated by the program instruction as follows. The program instruction 55 was supplied to instruction decode hardware 56, and the instruction decode hardware output a base address, an index address and a displacement address according to standard IBM System/370 architecture. The base and index addresses were used to access corresponding entries in registers 58, and the outputs from registers 58 and the displacement address were added in an adder 60 to yield a virtual address, also in accordance with standard IBM System/370 architecture. This virtual address was input to multiplexor 52 for the logic one selection. If an AGI exists but there is no entry in table 34, then the current program instruction must wait for the virtual address to be computed in the manner described above using instruction decode hardware 56, registers 58 and adder 60. Also, the table management circuitry 32 uses this result, as described below, to create an entry in table 34 to predict the next iteration of the program instruction.

The table management circuitry 32 of prediction system 30 operates according to the following strategy; the detailed circuitry is described after the strategy. As noted above, during each iteration of a program instruction, the address of the program instruction (I-addr) is applied to address decode logic 33 associated with table 34'. The address decode logic uses certain of the bits of the program instruction address to address a corresponding row in the table. Then, the full address in that row is read out of the table and compared to the full program instruction address. During the first iteration of the program instruction, there will not be an entry for the program instruction in the table, i.e. a "miss", so one will be created. When the entry is first created, the delta one field is set to zero and the reference address field is set to the actual address. Delta one changes only when two consecutive actual deltas are the same as each other and different than delta one. As noted above, each prediction equals the reference address plus delta one. Thus, for constantly spaced addresses, such as addresses of consecutive elements in a matrix row, the first two predictions will be wrong but all subsequent predictions in the same row will be correct. However, when addressing a second row in the same matrix after adding the elements in the first row, the prediction for the address of the first element in the second row will be wrong, but the prediction for each other element in the second row will be correct. When addressing a first row in another matrix with a different inter-element spacing, after adding the elements in the first matrix, the prediction for the first and second elements in the first row will be wrong, but the prediction for the remaining elements in the first row will be correct. Also, the predictions for the first element of the second and each subsequent row of this other matrix will be incorrect, but the predictions for the remaining elements in the second and subsequent rows will be correct. Thus, this strategy provides a high number of correct predictions in many scenarios in which data from rows of one or more matrices are added together, even when the spacing between successive row elements varies from matrix to matrix. A prior art prediction technique which provides a never changing delta would not suffice in the foregoing scenario where the elements from the rows of this other matrix are not spaced by the same delta as the elements frown the rows of the first matrix. Nor would it be optimum to update delta one with each actual delta because this would cause an incorrect prediction for both the first and second elements within each row of the same and different matrices. Therefore, the strategy of the present invention which updates delta one only when two successive actual deltas are the same as each other and different than the existing delta one, is better than these two other strategies; the present invention suffers only one incorrect prediction for the second row and each subsequent row of both matrices.

FIG. 2 illustrates the table management circuitry 32. In addition to the reference address and delta one, table 34' stores for each entry 37 a delta two field. When table 34' is addressed for a first iteration of a program instruction, there is no entry for the program instruction, and signal line 45 is a logic zero. Thus, there is no address prediction. Signal line 45 selects zero inputs to pass through multiplexers 36 and 39 to comparators 72 and 74, respectively. (In all of the logic diagrams, a logic zero selection to any multiplexor selects the left data input and a logic one selection selects the right data input.) The logic zero on signal line 45 also selects the actual address (for this first iteration of the program instruction) to pass through a multiplexer 41 to one input of a subtractor 70. The other input to subtractor 70 is also the actual address so the output from subtractor 70 is zero for this first iteration. This zero output from subtractor 70 is written into the delta two field of table 34 via signal line 75, and is supplied to comparators 72 and 74. Because comparator 72 receives zeros at both of its inputs, the output of comparator 72 is a logic one, the output of inverter 80 is logic zero and the output of AND gate 82 is logic zero. The logic zero from multiplexor 36 is supplied as an input to 36, multiplexer 86. Thus, AND gate 82 selects the zero input to multiplexor 86 which is supplied by the output from multiplexor and a zero is written into the delta one field of table 34 via signal line 87. Also, the actual address is written into the reference address field of the table entry via signal line 84. As noted above, the data stored in the table 34' is read out before the table is updated by reading out of the table during an early phase of a clock cycle and updating the table during a latter phase of the same clock cycle.

Upon the second iteration of the program instruction, signal line 45 is a logic one and the address prediction circuitry 35 makes an address prediction based on the stored reference address plus delta one. However, the address prediction is incorrect, assuming equally spaced actual addresses, because delta one initially equals zero. After the second and each iteration of the program instruction, the table management circuitry 32 updates the corresponding table entry 37 as follows. The reference address, delta one, and delta two are read from the table 34' to provide inputs to the circuitry 32 during calculation of each update; the updates are then made to the table The signal line 45 supplies the logic one to multiplexors 36, 39 and 41 to select the right data input to each. Thus, the stored reference address is passed to one input of subtractor 70. The other input to the subtractor is the actual address and the output of the subtractor is the actual delta. The actual delta is also supplied to comparator 74. During this first real access of this program instruction entry (i.e. during this second iteration), the stored delta two, which is also supplied to comparator 74, equals zero. Assuming the actual address does not equal the reference address, comparator 74 will output a logic zero and AND gate 82 will output a logic zero. Consequently, the left input, delta one, obtained from the table 34' via multiplexor 37 will be selected by mulitplexor 86 and written again into the delta one field; delta one will remain zero. The actual delta will be written into the delta two field via signal line 75. Also, the reference address will be updated via signal line 84.

During the third iteration of the program instruction, the prediction based on the reference address plus delta one from the table 34' is also wrong for constantly spaced addresses because delta one still equals zero. Pursuant to this third iteration, the table entry is updated again. Delta two, obtained from the table 34', is passed through multiplexor 39 to comparator 74. Because the actual delta for this third iteration equals the previous actual delta which was stored as delta two, comparator 74 will output a logic one into AND gate 82. Delta one, obtained from the table 34', is passed through multiplexor 36 to comparator 72. Comparator 72 will output a logic zero because delta one, obtained from the latch equals zero and does not equal the actual delta one. This logic zero will be inverted by inverter 80 and then applied to AND gate 82. Thus, AND gate 82 will be satisfied and selects the right, actual delta input of multiplexor 86, and the actual delta will be written into the delta one field of the table 34. Also, the actual delta is written again into the delta two field of table 34 and the .actual address is written into the reference address field of table 34.

For the fourth and each subsequent iteration of this program instruction, the prediction based on the reference address plus delta one from the table 34' will be correct for constantly spaced addresses. Delta one will not change unless two successive actual deltas are equal to each other and different than the stored delta one. In such case, the delta one field will be updated with the current actual delta. Thus, when the last element of a row is addressed, and the first element of the next row is addressed, the prediction will be wrong for the first element but correct for the second and all other elements of this next row (assuming the spacing is the same for all the elements in the row). When the row elements for the next matrix are accessed, the prediction will be incorrect for the first two elements of the first row assuming the spacing is different than between the row elements of the first matrix but will be ,correct for the third and all other row elements of the first row. The prediction will also be correct for the second and each subsequent row element of the second row and each subsequent row in this next matrix.

Figure 3:
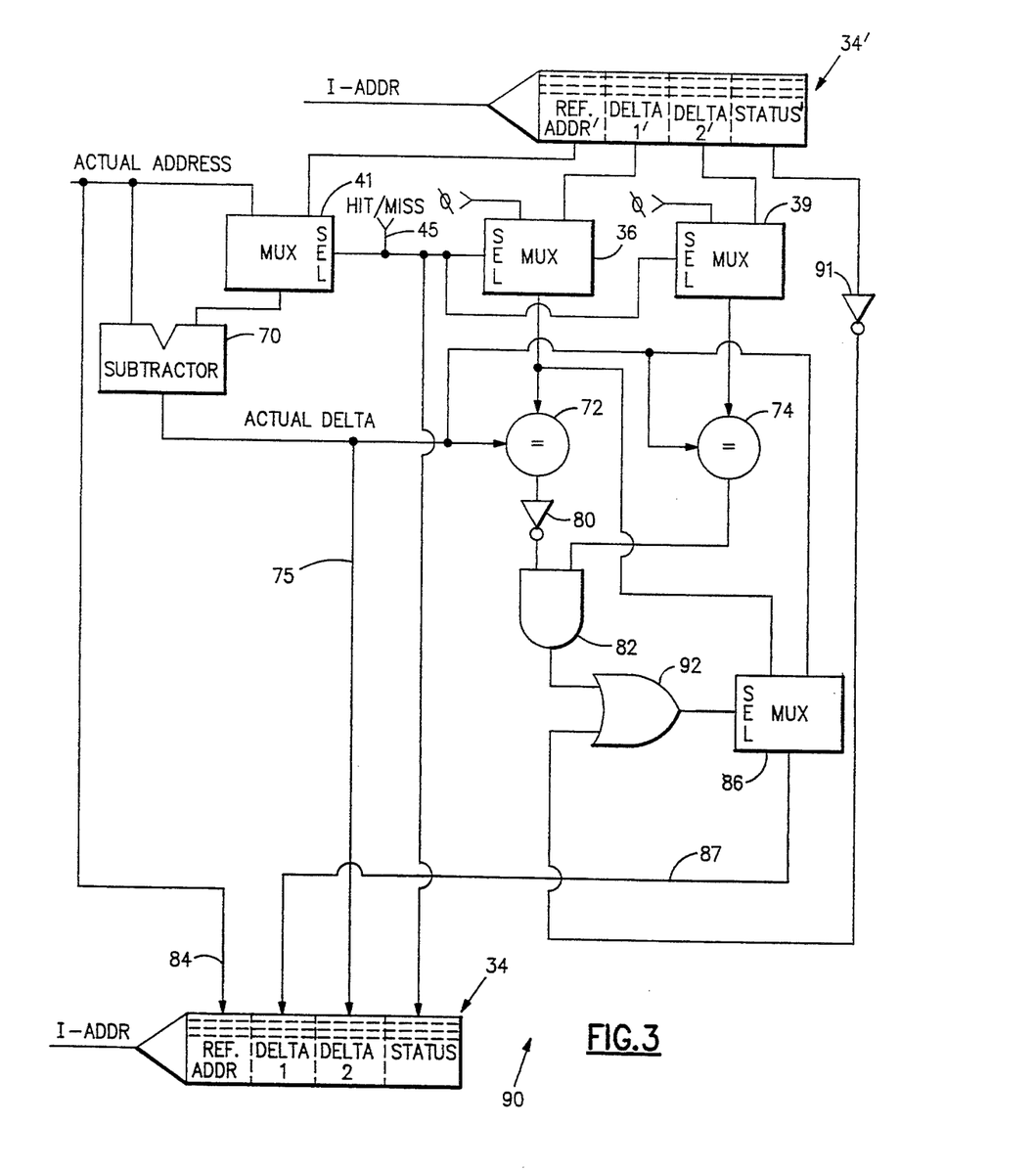
FIG. 3 is a block diagram of table management circuitry of another embodiment of the present invention.

FIG. 3 illustrates table management circuitry generally designated 90 which is similar to circuitry 32 of FIG. 1 except that circuitry 90 yields a correct prediction for the third iteration of the program instruction for constantly spaced addresses. The differences between circuitry 32 and circuitry 90 are that each table entry of circuitry 90 includes a status field and circuitry 90 includes inverter 91 and OR gate 92. In the circuitry 32, delta one was not set equal to the actual delta until the table 34 is are updated after the third iteration of the program instruction. Therefore, the prediction of circuitry 32 was not correct until the fourth iteration of the program instruction. However, using circuitry 90, when the table entry is created after the first iteration, the status field is set to logic zero by signal line 45, and delta one and delta two are both set to logic zero. While the prediction for the second iteration is incorrect (because delta one equals zero), the logic zero from the status field is inverted by inverter 91 and supplied to OR gate 92. Thus, the output of OR gate 92 is logic one, and selects the actual delta input to pass through multiplexor 86 and be written into the delta one field. Thus, the prediction for the third iteration of the program instruction will be correct, assuming constant spacing between addresses. The table 34 is updated after the third and each subsequent iteration of the program instruction as described above because the status field is equal to one, and causes a logic zero to be applied to OR gate 92. Thus, delta one is subsequently updated only if two successive actual deltas are equal to each other and different than the previously stored delta one.

Figure 4:
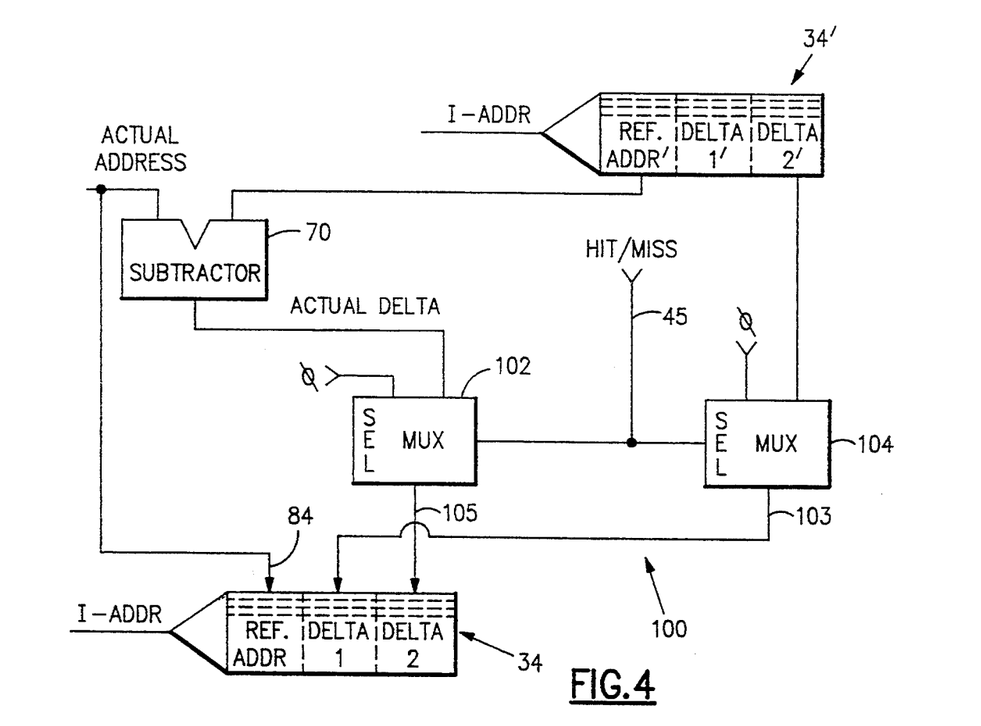
FIG. 4 is a block diagram of table management circuitry of another embodiment of the present invention.

FIG. 4 illustrates table management circuitry generally designated 100 according to an alternate embodiment of the present invention. Table management circuitry 100 accurately predicts addresses based on the previous actual address plus delta one, where delta one equals the actual delta from the next to last iteration. If the delta ones alternate between two values, then circuit 100 can reliably predict actual addresses which alternate between two deltas. One common example is where the two deltas are the positive and negative of the same value, then circuit 100 can reliably predict actual addresses which alternate between two addresses. In circuit 100, when the table entry is first created after the first iteration of the program instruction, the zero inputs to multiplexors 102 and 104 are selected. This causes zeros to be written into the delta one and delta two fields via signal lines 103 and 105, respectively. Also during creation, the actual address is written into the reference address field via signal line 84. During the second iteration of this program instruction, the signal line 35 is logic one. Consequently, multiplexor 104 selects delta two obtained from table 34' (which was updated after the first iteration) and writes delta two into the delta one field of the table 34 via signal line 103. Also, multiplexor 102 selects the actual delta output from subtractor 70 to be written into the delta two field via signal line 105. During the third iteration of this program instruction, the delta two obtained from the table 34' (which was updated after the first iteration), is written into the delta one field of table 34, and the actual delta is written into the delta two field of table 34. Thus the predicted address is based on the previous address plus delta one, and delta one equals the actual delta from the next to last iteration. This prediction strategy continues for subsequent iterations. If the actual addresses alternate between two addresses, then the table entry will store delta one equal the negative of delta two.

Figure 5:
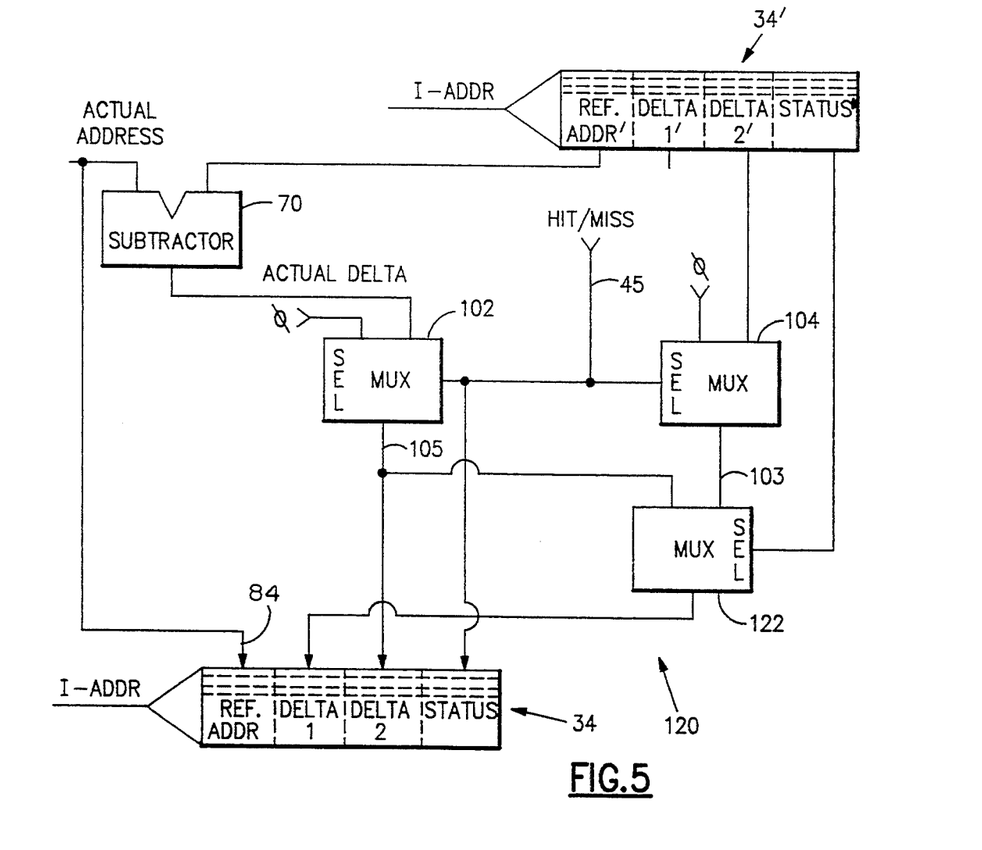
FIG. 5 is a block diagram of table management circuitry of another embodiment of the present invention.

FIG. 5 illustrates another table management circuit generally designated 120 which is similar to circuit 100 except when the table 34 is updated after the second iteration of the the program instruction, both delta one and delta two are set equal to the actual delta. (In circuit 100, only delta two was set equal to the actual delta after the second iteration.) In circuit 120, a logic zero is stored in the table 34 as a status bit upon creation of the table entry after the first iteration and then copied into table 34'. This status bit from table 34' selects the actual delta to pass through multiplexor 122 and be written into the delta one field after the second iteration of the program instruction. Thus, the actual delta is written into the delta one field after the second iteration. For all subsequent iterations, the status field from table 34' is a logic one, so circuit 120 operates as does circuit 100, i.e. the delta two field is written via multiplexors 104 and 122 into the delta one field to alternate the delta ones.

Figure 6A:
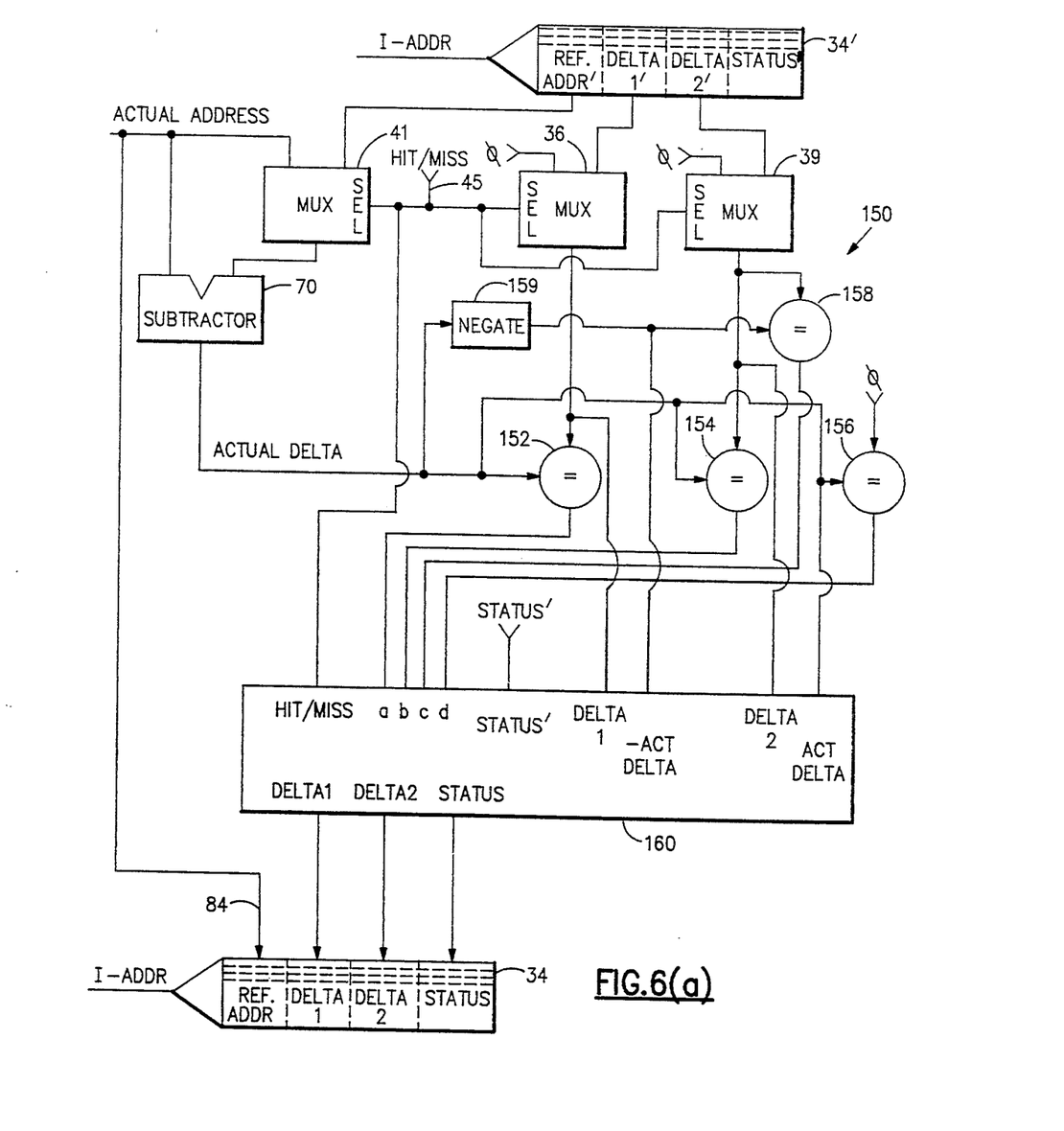
FIG. 6(a) is a block diagram of table management circuitry of another embodiment of the present invention.
Figure 6B:
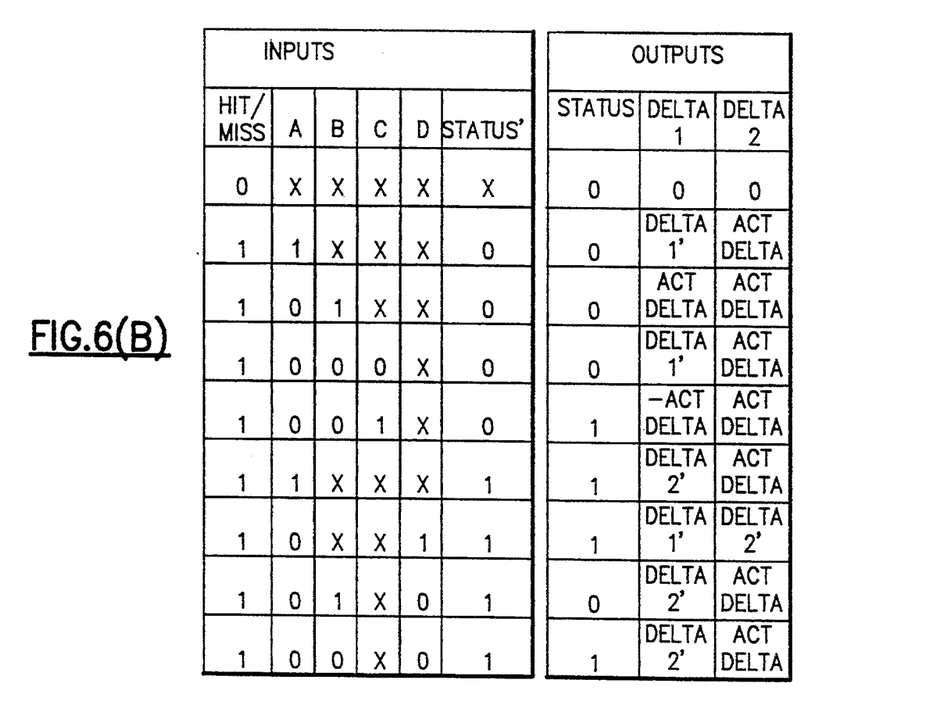
FIG. 6(b) is a logic chart that defines logic circuitry within the table management circuitry of FIG. 6(a).

FIG. 6(a) illustrates another table management circuit generally designated 150 according to the present invention. System 150 is capable of providing the prediction strategy of system 90 or, when the actual addresses alternate between two addresses, the prediction strategy of system 120. As described in more detail below, the initial assumption is to use the strategy of system 90. The strategy of system 90 is, illustrated by the first, second, third and fourth rows of the chart of FIG. 6(b). However, whenever the actual delta as output from subtractor 70 does not equal either delta one or delta two, a check is made to determine if the actual delta equals the negative of delta two. If so, the predictions strategy switches to that of circuit 120 except that when the table entry is updated after the actual delta is found not to equal either delta one or delta two, then the negative actual delta is written into the delta one field and the actual delta is written into the delta two field. This prepares the table entry to make the correct prediction for the next iteration. This is indicated in the chart of FIG. 6(b) by the fifth row. When in the circuit 120 mode, the delta two from table 34' (from the previous iteration) is written into the delta one field of table 34 and the actual delta is written into the delta two field of table 34. This is indicated in the chart of FIG. 6(b) by the sixth, and ninth rows. When two consecutive actual deltas are equal to each other, then system 150 returns to the prediction strategy of system 90. This is detected by comparing the actual delta to the previously stored delta two, and is initiated by the eight row.

There is a special case for the sequence (d, −d, 0, d, −d, 0, . . . ). If in circuit 120 mode, and the actual delta is zero, system 150 assumes this special case, and does not change delta one or delta two. This is indicated in the chart of FIG. 6(b) by the seventh iteration. The zero delta delays the alternating sequence, and in this case, at best two of three predictions would be correct.

The following is a more detailed description of circuit 150. As shown in FIG. 6(a), during the first iteration of the program instruction, signal line 45 is a logic zero so the actual address is passed through multiplexor 41 to subtractor and the output of the subtractor 70 is zero. This zero output is supplied to one input of each of comparators 152, 154, 156 and 158 (via negater 159), and to the actual delta input of logic circuitry 160. Also, during this first iteration, the zero inputs to multiplexors 36 and 39 are also passed through to the respective comparators 152, and 154 and 158, and to the D1 and D2 inputs of the logic circuitry 160. The logic chart illustrated in FIG. 6(b) defines logic circuitry which receives; as inputs the hit or miss signal, the outputs from comparators, 152, 154, 158, and 156, status' from table 34', actual delta, −actual delta, delta one from table 34' and delta two' from table 34', and yields as outputs delta one, delta two, and status for updating table 34. The actual address is passed directly to the reference address field of table 34 via signal line 84. The table of FIG. 6(b) indicates that the initial conditions for the entry in table 34 after the first iteration are zero for delta one, delta two and status.

During the second (and each subsequent) iteration of this program instruction, signal line 45 provides a logic one, and the reference address is passed through multiplexor 41 to the subtractor 70. The output of the subtractor is the actual delta which is applied to one input of each of comparators 152, 154, and 156. The comparator 158 receives the negative of the actual delta via negater 159. Also, during the second and each subsequent iteration of this program instruction, delta one' obtained from table 34', is passed via multiplexor 37 to comparator 152 and the logic circuitry 160. Also, delta two' obtained from table 34' is passed via multiplexor 39 to comparators 154 and 158 and the logic circuitry 160.

Figure 7A:
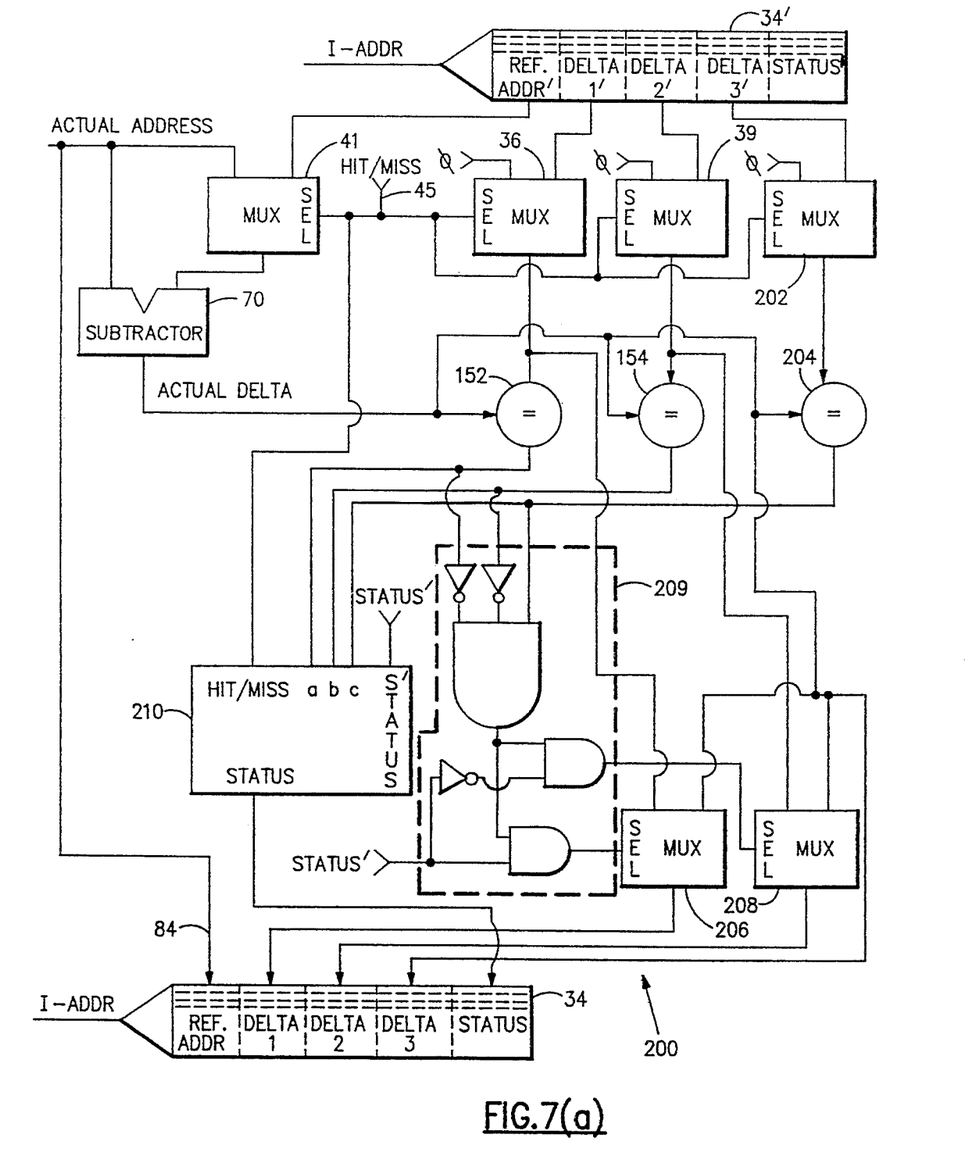
FIG. 7(a) is a block diagram of table management circuitry of another embodiment of the present invention.

FIG. 7(a) illustrates table management circuit generally designated 200 according to another embodiment of the present invention. Table 34 for circuit 200 stores a reference address, delta one, delta two, delta three and status. Circuit 200 makes two predictions for each iteration of the program instruction (after the first), necessitating a two-port cache and two accesses to the cache for each such iteration. Part of the strategy of circuit 200 is similar to that of circuit 90, in which delta one is constant until two successive actual deltas are equal and do not equal delta one. However, circuit 200 changes delta one or delta two under the following circumstances (based on delta three). Delta three is the actual delta from the next to last iteration. When neither delta one nor delta two results in a correct prediction but delta three is the same as the actual delta, then either delta one or delta two is changed to the actual delta. The choice of which delta, one or two, to changed is FIFO based such that which ever delta one or two was changed to its current value list, is changed to the delta three value.

Figure 7B:
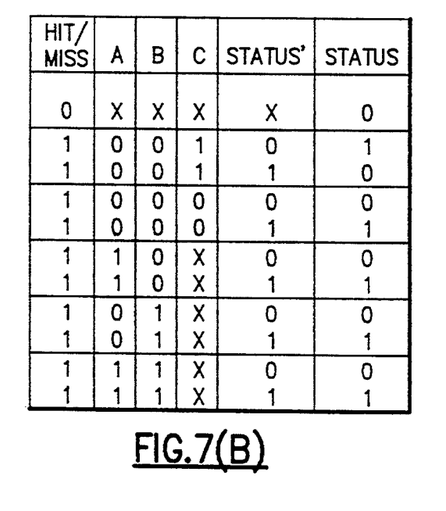
FIG. 7(b) is a logic chart that defines logic circuitry within the table management circuitry of FIG. 7(a).

The following is a more detailed description of circuit 200. As shown in FIG. 7(a), during the first iteration of the program instruction, signal line 45 is a logic zero so the actual address is passed through multiplexor 41 to subtractor 70, and the output of subtractor 70 is zero. This zero output is supplied to one input of each of comparators 152, 154, and 204, and to logic circuitry 210. Also, during this first iteration, the zero inputs to multiplexors 36, 39 and 202 are also passed through to the respective comparators 152, 154 and 204. Also, during this first iteration, the zero inputs to multiplexors 36 and 39 are passed to multiplexors 206 and 208, respectively. Logic circuitry 209 receives outputs from comparators 152, 154 and 204, and the status' from table 34' (which equals zero at this time), and controls multiplexors 206 and 208. Logic circuitry 210 receives signal line 45, status' from table 34', and outputs from comparators 152, 154 and 204. A logic chart illustrated in FIG. 7(b) defines logic circuitry 210 which yields the status input for the entry in table 34. The outputs from multiplexors 206 and 208 and the output from subtractor 70 yield inputs for delta one, delta two, and delta three for the table 34'. The actual address is passed directly to the reference address field of the table 34. The chart of FIG. 7(b) indicates that the initial conditions are zero for delta one, delta two, delta three and status in table 34. During the second and each subsequent iteration of this program instruction, signal line 45 provides a logic one, and the stored reference address is passed through multiplexor 41 to the subtractor 70. The output of the subtractor is the actual delta which is applied to one input of each of comparators 152, 154, and 204, and multiplexors 206 and 208. Also, during the second and each subsequent iteration of this program instruction, the stored delta one' is passed through multiplexor 36 to comparator 152 and multiplexor 206, the stored delta two' is passed through multiplexor 39 to comparators 154 and multiplexor 208, and the stored delta three' is passed through multiplexor 202 to comparator 204. Logic circuitry 209 receives outputs from comparators 152, 154 and 204 and the stored status' and controls multiplexors 206 and 208. Logic circuitry 210 receives signal line 45, status' and outputs from comparators 152, 154 and 204. The logic chart illustrated in FIG. 7(b) defines logic circuitry 210 which yields the status input to table 34 for the corresponding entry. The outputs from multiplexors 206 and 208 and the output from subtractor 70 yield inputs for delta one, delta two, and delta three for the entry in table 34. The actual address is passed directly to the reference field of the table entry.

Figure 8:
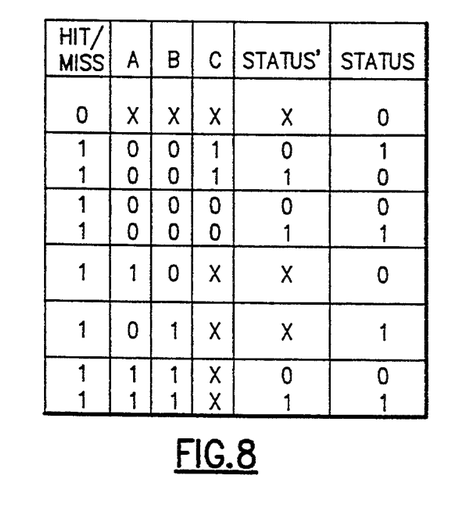
FIG. 8 is a logic chart that defines logic circuitry within table management circuitry of another embodiment of the present invention, that is otherwise the same as the table management circuitry of FIG. 7(a).

FIG. 8 is a chart which defines other logic circuitry that substitutes for logic circuitry 210 in circuit 200 to yield another table management circuit generally designated 300 according to the present invention. The remainder of circuit 300 is the same as that of circuit 200. The strategy of circuit 300 is the same as that of circuit 200 except circuit 300 uses a least recently used (LRU) strategy for determining which of the deltas, one or two, to replace with delta three when the actual delta equals delta three but does not equal either delta one or delta two.

While circuits 200 and 300 provide better predictions than the other circuits, circuits 200 and 300 require two accesses to the cache to make the two predictions for each iteration versus one access to the cache for other circuits. Circuits 90 and 150 provide the most reliable predictions of the circuits that require only one access to the cache.

In order to reduce the size of delta tables, the number of bits in the delta fields can be reduced. If the number of bits needed to represent the delta value is not sufficient, zero can be used instead. The frequency of large delta values is very small.

The number of bits in the delta fields also affects the rate of success of the predictions because with fewer bits some large delta values cannot be represented. The success rate falls very slowly as size is reduced from thirty two to eight bits. With fewer than eight bits the success falls noticeably. This suggests that eight bits are sufficient for the delta fields. For instructions that access data in four-byte units, the delta is very nearly always a multiple of four. These facts suggest that six bits can be used with two low-order zero bits appended.

The number of bits for the delta fields can also be based on the opcode. For example, the interpretation for a load command could be to append two zero bits, load halfword (LH) means to append one zero bit, and insert character (IC) means to use as is. It was also observed that positive deltas are more frequent than negative deltas, and the delta values could be skewed toward the positive. For example, in two's complement notation, eight bits represents $-128$ to $+127$. By adding sixty five to each delta, the range is $-63$ to $+192$. This allows the more frequent positive deltas to be represented more effectively. Each of these optimizations may allow six delta bits, or fewer, to give results nearly the same as for thirty two bits.

A small delta has another advantage. Each time a delta-based prediction is made, the cache may be accessed. For small deltas, it is likely that the same cache line is accessed. Therefore there will be few extra cache misses generated if the predicted address is incorrect.

The prediction success rate also depends on the size of table 34 and set associativities. The behavior is typical of a cache: size is more important than associativity and there are diminishing returns as associativity increases. For a larger table 34, hits are more frequent, resulting in correct predictions more often.

Based on the foregoing, address prediction circuits according to the present invention have been disclosed. However, numerous modifications and substitutions can be made without deviating from the scope of the present invention. For example, different algorithms can be combined, extra status bits can be added to improve prediction on the second or third iterations, and other more complex algorithms based on the principles described here can be designed. Therefore, the invention has been disclosed by way of illustration and not limitation and reference should be made to the following claims to determine the scope of the present invention.

We claim:

1. A system for predicting an address required to execute a current iteration of a program instruction, said system comprising:

means for storing an address required to execute a preceding iteration of said program instruction;

means for determining differences between addresses required to execute successive iterations of said program instruction prior to said current iteration;

means for predicting the address required to execute the current iteration of said program instruction based on the address required to execute the preceding iteration of said program instruction plus a current value of an increment; and means for setting said increment before said current iteration equal to a difference between two addresses required to execute two successive iterations of said program instruction and updating said increment when two actual differences between three addresses required to execute three successive iterations of said program instruction are equal to each other and different than the set increment, said update being said actual difference.

2. A system as set forth in claim 1 further comprising:

means for storing the difference between the address required to execute the current iteration of said program instruction and the preceding iteration of said program instruction; and means for updating the current value of said increment to a difference between an address required to execute a next iteration of said program instruction and the current iteration of said program instruction when the difference equals a difference between the addresses required to execute the current iteration of said program instruction and the preceding iteration of said program instruction but does not equal the current value of said increment.

3. A system as set forth in claim 1 wherein, for each of some predictions for successive iterations of said program instruction, the updating means negatives the current value of said increment, whereby the predictions alternate between two addresses for multiple iterations of said program instruction.

4. A system as set forth in claim 3 wherein said prediction means makes said some predictions when a difference between the addresses required for the current iteration of said program instruction and the preceding iteration of said program instruction is different than a difference between addresses required for said preceding iteration of said program instruction and an iteration preceding said preceding iteration of said program instruction and the current value of said increment.

5. A method for predicting an address required to execute a current iteration of a program instruction, said method comprising the following steps performed by computer hardware: storing an address required to execute a preceding iteration of said program instruction;

determining differences between addresses required to execute successive iterations of said program instruction prior to said current iteration;

predicting the address required to execute the current iteration of said program instruction based on an address required to execute the preceding iteration of said program instruction plus a current value of an increment;

setting said increment before said current iteration equal to a difference between two addresses required to execute two successive iterations of said program instruction; and updating said increment when two actual differences between three addresses required to execute three successive iterations of said program instruction are equal to each other and different than the set increment, said update being said actual difference.

6. A method as set forth in claim 5 further comprising the steps of:

storing a difference between the addresses required to execute the current iteration of said program instruction and the preceding iteration of said program instruction; and updating the current value of said increment when a difference between an address required to execute a next iteration of said program instruction and the current iteration of said program instruction equals a difference between the address required to execute the current iteration of said program instruction and the preceding iteration of said program instruction but does not equal the current value of said increment.

7. A method as set forth in claim 6 wherein, for each of some predictions for successive iterations of said program instruction, the step of updating the current value of said increment comprises the step of negativing the current value of said increment, whereby the predictions alternate between two addresses for multiple iterations of said program instruction.

8. A method as set forth in claim 7 wherein said step of updating the current value of said increment comprises the step of negativing the current value of said increment when a difference between addresses required for the current iteration of said program instruction and the preceding iteration of said program instruction is different than the difference between addresses required for said preceding iteration of said program instruction and an iteration preceding said preceding iteration of said program instruction and the current value of said increment.

* * * * *